United States Patent [19]

Ford

[11] Patent Number: 4,655,927
[45] Date of Patent: Apr. 7, 1987

[54] SEPARATING OIL EMULSIONS

[75] Inventor: Douglas L. Ford, Eastwood, Australia

[73] Assignee: Memtec Limited, New South Wales, Australia

[21] Appl. No.: 758,709

[22] Filed: Jul. 8, 1985

[30] Foreign Application Priority Data

Nov. 7, 1983 [AU] Australia ............................ PG2239

[51] Int. Cl.$^4$ ............................................ B01D 13/00
[52] U.S. Cl. .................................. 210/639; 210/651; 210/652
[58] Field of Search ................... 210/651, 500.2, 433.2, 210/652, 639

[56] References Cited

U.S. PATENT DOCUMENTS 3,331,772  7/1967  Browscombe et al. ....... 210/500.2 X
3,620,970  11/1971  Klug et al. .................... 210/500.2 X
4,501,785  2/1985  Nakanishi .................... 210/500.2 X

OTHER PUBLICATIONS

"Ultrafiltration Saves Oil, Cleans Waste", from Iron & Steel Int., vol. 52, No. 6, 12–1979, p. 391.

Primary Examiner—Frank Spear
Attorney, Agent, or Firm—Oblon, Fisher, Spivak, McClelland & Maier

[57] ABSTRACT

Water is separated from an oil emulsion containing a surface active agent by passing the emulsion through a polymeric porous membrane cross-flow ultra-filter. Either the oil emulsion feedstock or the membrane is treated with a hydrophilic colloid so that the effective pore size of the composite membrane so formed by the colloid will be reduced as the surface tension falls in the presence of the surface active agent in the oil emulsion. The hydrophilic colloid is selected according to the chemical ionic classification of the surface active agent.

8 Claims, No Drawings

SEPARATING OIL EMULSIONS

FIELD OF INVENTION

This invention relates to the treatment of oil emulsions particularly those containing a surface active agent.

BACKGROUND ART

The separation of oil from emulsions in water is of great utility in oil production, in oil shipping where ballast tanks and bilges generate emulsions and in industry where oil emulsions are used for cutting and cooling.

If the residual water is to be reused or disposed of in sewers or waterways, the degree of oil removal must be such that the residual water contains less than 10 parts per million of hydrocarbon oil.

It is also desirable that the separated oil be free of water since water often contains salts and causes corrosion. Although oil can contain 40% water and still burn, the chimney steam loss reduces the calorific value and the salts fuse on boiler tubes, leading to tube failure and fusion of furnace walls.

The "Oil/Water Separation State-of-the-Art" publication prepared for Industrial Environment Research Laboratories in Cincinnati, Ohio by Rutgers State University, New Brunswick, N.J., U.S. Department of Commerce National Technical Information Service P.B—280755 is a thorough review of the problem and of updated separation procedures.

Few known procedures are successful when the oil emulsion is stabilised by a surface active agent (surfactant), especially when the maximum allowable oil content of the separated water is 10 parts per million. Complex chemical, physical and biological methods, often all three in sequence, are needed if the water must also meet rigid environmental specifications for detergents.

Oil/water/surfactant blends occur on a huge scale in ship bilges and ballast tanks. A surfactant can enter the ship system from deck cleaners, oil dispersers, laundry wastes, fire foams and deliberate addition to aid cleaning of massive oil storage tanks. Moreover, a surfactant is an essential ingredient of industrial cutting and cooling emulsions and associated rinsing liquors.

In all these uses, the surfactant concentration and even the chemical nature of the surfactant are very variable due to sporadic need or uncontrolled dilution with fresh or salt water. Ship requirements indicate the need for an on-board system so that water, free of oil, but still containing biodegradable surfactants can be released at sea, rather than be brought to shore where dockside waters cannot accept the detergents and other soluble contaminants which may arise from chemical and biological attack on the oil in the bilges. For example, poisonous hydrogen sulphide may be formed and, if so, needs immediate removal along with other biological, soluble products while still at sea.

Recently, ultra-filtration has been used with some success for these surfactant stabilised emulsions. In principle, the oil is retained by its inability to flow through the very fine hydrophilic pores of the ultra-filter membrane whilst water passes under quite low pressure. The oil retention is by a combination of geometry and surface tension. The oil breakthrough pressure, P, is given by:

$$P = \frac{4S \cos a}{d}$$

Where:
S is the oil/aqueous interfacial tension,
a is the contact angle of the continuous phase of the pore fluid with the pore wall,
d is the pore diameter.

Surfactants lower the oil/aqueous interfacial tension S and cause breakthrough of oil at even low pressures. The interaction is complex since the surfactant forms micellar structures with itself and with the oil. The critical micellar concentration depends on surfactant composition, on pH, on salts and on temperature.

The net effect of all this complexity is that ultra-filters are usually designed with some latitude to handle these factors by making the pores of the membrane as small as can be to pass some acceptable low flow of permeate water output. This low flow rate must then apply (even though the input emulsion could accept a larger pore size and hence a larger output) because the pore size is relatively fixed—this is wasteful and uneconomic. One solution to this problem is to have a plurality of filter cartridges of different pore size and to use surface tension to indicate when it is safe to bring into use the larger pores. However, the larger pores must remain totally unused as soon as the surface tension drops.

A major problem with all oil/water ultrafilters arises because they are used in the "cross-flow" mode—that is, the feed flows across the ultrafilter where some water permeates, but most of the emulsion (now richer in oil) returns to the feed. Thus, the oil concentration continuously rises which always reduces permeation rate, but this is not the worst effect. Most ultrafilters also show some rejection of surfactant so that the surfactant concentration also rises rapidly in the diminishing recycle aqueous phase. Hence all the water cannot be substantially removed before oil breaks through. Even ultrafilters with pores rejecting over 99% of ovalbumin of molecular weight 45,000 cannot bring the oil concentration above 50% in the presence of most surfactants.

It is an object of this invention to overcome the aforementioned problems which arise in the ultra-filtration of oil emulsions by providing a membrane for the filter in which the pore size is relatively coarse to give relatively larger flow rates when the emulsion is free or substantially free of surfactant or other additive and in which the pore size will reduce upon fall in surface tension when the surfactant or other additive is present.

DISCLOSURE OF THE INVENTION

According to the invention there is provided a polymeric porous membrane, cross-flow ultra-filter for use in separating water from an oil emulsion which contains a surface active agent or which is stabilized by the presence of fine interfacial solids characterised in that the membrane is treated with a pre-selected hydrophilic colloid whereby the effective pore size of the composite membrane will be reduced as the surface tension falls in the presence of the surface active agent or the stabilizer in the oil emulsion.

The invention also provides a method of separating water from an oil emulsion which contains a surface active agent or which is stabilized by the presence of fine interfacial solids comprising the steps of:

(i) adding a pre-selected hydrophilic colloid to the emulsion, and, (ii) passing the emulsion and colloid through a cross-flow ultra-filter containing a polymeric porous membrane.

Thus, in general terms, the invention provides a mechanism which will allow the ultra-filtration membrane to possess rather coarser pores and thus give useful high rates when there is little or no surfactant but will shrink the pore size (or at least produce the equivalent effect) as the surface tension falls. This effect can be achieved by the addition of selected hydrophilic colloids to counteract the effect of the surfactants. Of course, the output falls but only to the minimum imposed by the changing system. In addition, the invention allows rejection of surfactant so that purer water may be discharged. The amount of hydrophilic colloid and any associated surfactant discharged with the water is small and may be safely disposed of at sea, in city sewers or by landfill since they can all be made biodegradable.

The molecular weight and/or the physical characteristics of the hydrophilic colloid to be added to the oil emulsion should be such that the colloid does not permeate the membrane. Preferably, the concentration of hydrophilic colloid is such that a "gel-limited" permeation rate applies, i.e. increase in trans-membrane pressure under the flow conditions gives no increase in permeation rate. Thus, the colloid is a dynamic superimposed layer.

The hydrophilic colloid must be carefully chosen, preferably by trail, according to the nature of the emulsion and the additives thereto. The composition of the hydrophilic colloid is generally determined by the chemical ionic classification of the surfactant. If the surfactant is anionic (for example, dodecylbenzenesulphonate) then the hydrophilic colloid must also be anionic to reject the surfactant by Donnan effects. The anionic colloid may be mixed with a nonionic colloid but not a cationic colloid. Similarly, for a cationic surfactant the colloid must be cationic. If the surfactant is nonionic the hydrophilic colloid must also be nonionic.

If the hydrophilic colloid is nonionic it must not be a substantially complete homologue of the surfactant, thus a polyethyleneglycol surfactant cannot be blocked with a very high molecular weight polyethyleneglycol such as "POLYOL COAGULANT" of Union Carbide Corporation. Indeed, where long chains are involved, even substantial (say 80%) identity of chemical constitution will render the colloid ineffective. This is to be expected since the surfactant can then "dissolve" or "associate" in the colloid gel as a mimic of the colloid which thus accepts it and allows it through.

Accordingly, the hydrophilic colloid for a popular long chain nonionic surfactant such as octylphenylpolyethyleneglycol ether must be a completely different chemical class such as gelatin (protein) or a branched ethyleneglycol derivative such as hydroxyethylcellulose.

DESCRIPTION OF PREFERRED EMBODIMENTS

In order that the invention may be more readily understood and put into practical effect, reference will now be made to the following examples:

EXAMPLE 1

An ultra-filter using nylon membranes made according to Australian Pat. No. 505,494 had pores which rejected 80% of edible gelatin and gave initially fast filtering at 250 L/M$^2$h of water permeate from a mixture of 2 volumes of water and 1 volume of oil at 50 kPa pressure. The filtration slowed as nearly all the water permeated, leaving the oil with less than 1% water.

The adverse effect of a surfactant in the feedstock was then demonstrated by adding 0.02% of p-tertoctylphenylpolyethyleneglycol ether (I.C.I. TERIC X10) to the water. After stirring for 12 hours, filtration led to some detectable oil wetting of the membrane. The addition of 0.05% TERIC X10 to the water led to some oil globules eventually penetrating with the water. Due to critical micellar effects a higher concentration of 0.2% TERIC X10 was less deleterious.

However, the addition of 0.2% hydroxyethylcellulose (Union Carbide Corporation "CELLOSIZE" QP52000H) to the water countered the effect of the 0.02% of TERIC X10 and allowed substantially all the water to permeate although the rate dropped to 20 L/M$^2$h at 50 kPa pressure.

EXAMPLE 2

The 0.2% hydroxyethylcellulose of EXAMPLE 1 was successfully replaced with 0.5% gelatin with identical results.

EXAMPLE 3

The 0.2% hydroxyethylcellulose in EXAMPLE 1 was replaced with 0.1% Union Carbide Corporation "POLYOX COAGULANT, a polyethyleneglycol of molecular weight over 1 million but after 20 hours stirring oil wet the filter. Trace wetting with oil was detected by staining the oil with 0.1% of WAXOLINE RED dye. For reliable on-ship use this would be regarded as unsuitable.

This example illustrates the ineffectiveness of a hydrophilic colloid (polyethyleneglycol) which is a homologue of the surfactant (p-tertoctylphenylpolyethyleneglycol ether).

EXAMPLE 4

EXAMPLE 1 was repeated with the addition of 0.005% of the anionic surfactant or wetter dodecylbenzenesulphonic acid. The 0.2% of nonionic colloid hydroxyethylcellulose failed badly to block the anionic wetter, even at this low dose.

EXAMPLE 5

EXAMPLE 4 was repeated but the 0.2% hydroxyethylcellulose nonionic colloid was replaced with 0.5% gelatin. Again the oil wet the filter as the gelatin failed to block the anionic wetter dodecylbenzenesulphonic acid.

EXAMPLE 6

The filter of EXAMPLE 1 was used to filter a 0.2% solution of the anionic hydrophilic colloid, sodium polystyrenesulphonate of molecular weight above 40,000 when it formed a gel-limited coating under moderate stirring. The solution filtered at 40 L/M$^2$h which was unchanged on the addition of 0.05% of the anionic detergent sodium dodecylbenzenesulphonate. However, the permeate then contained only traces of the anionic detergent, the rejection through-out the filtration being 97%. The mixture did not lead to oil penetration of the filter over 20 hours although rapid penetration occurred when the sodium polystyrenesulphonate was omitted.

EXAMPLE 7

EXAMPLE 6 was repeated but with the filter modified to contain 0.5% by weight of the group —CH(OH)SO$_3$Na. The now anionic filter itself rejected between 30% and 80% of the anionic sodium dodecylbenzenesulphonate detergent depending on concentration, pH, salt concentration and temperature. When 0.2% of the anionic hydrophilic colloid sodium polystyrenesulphonate was also used to form an anionic gel on top of the anionic filter, the rejection of detergent was over 99% at an initial concentration of 0.05%. The underlying filter did not wet with oil in 24 hours when used continuously. The permeate contained only 5 parts per million of detergent although the initial concentration was 500 parts per million.

EXAMPLE 8

An oil emulsion in which the aqueous phase contained 200 ppm of nonionic detergent, octylphenyldecaethyleneglycolether, plus 500 ppm of anionic detergent, sodium dodecylbenzenesulphonate readily wet the filter of EXAMPLE 1. However, the filter was not wet with oil when 0.2% of the nonionic colloid hydroxyethylcellulose and 0.2% of the anionic colloid sodium polystyrenesulphonate were added.

EXAMPLE 9

EXAMPLE 6 was repeated but the 0.2% sodium polystyrenesulphonate of high molecular weight was replaced by the rather permeable anionic colloid, heparin, of molecular weight 14,000 to 20,000. It was found that the filter adsorbed much of the heparin and the resulting filter gave 43% to 55% rejection of the sodium dodecylbenzenesulphonate. However when the anionic filter of EXAMPLE 7 was used the heparin was not adsorbed strongly. The result was that the joint use of an anionic filter and a too-low molecular weight anionic colloid, heparin, gave zero rejection although, as shown earlier, each individually had given reasonable rejection. Thus, only high molecular weight gel-limiting hydrophilic colloids should be used. Oil wetting of the filters matched exactly poor rejection of the anionic detergent in the individual and joint use of the anionic filter and anionic colloid.

The above examples indicate the nature of the invention and are not to be taken as limiting the scope of the invention.

I claim:

1. A method of separating water from an oil emulsion which contains a surface active agent comprising the steps of:
   (i) adding to said oil emulsion a hydrophilic colloid corresponding to the chemical ionic classification of said surface active agent and of the nature and in an amount effective to reduce the effective pore size as the surface tension falls in the presence of the surface active agent in the oil emulsion of a cross-flow ultra-filter containing a polymeric porous membrane which is used to separate said water from the oil emulsion, and,
   (ii) passing the emulsion and hydrophilic colloid through said cross-flow ultra-filter containing a polymeric porous membrane.

2. A method according to claim 1 wherein the hydrophilic colloid forms a gel-limited coating on the membrane.

3. A method according to claim 1 wherein the surface active agent is anionic and the hydrophilic colloid is a mixture of anionic and nonionic colloids.

4. A method according to claim 1 or claim 3 wherein the hydrophilic colloid is nonionic and is not a substantially complete homologue of the surface active agent.

5. A method according to claim 1 wherein the hydrophilic colloid is selected from the group consisting of a branched ethyleneglycol derivative, gelatin and sodium polystyrenesulphonate.

6. A method according to claim 1 wherein the membrane is modified to provide an ionic membrane of the same chemical ionic classification as the colloid.

7. A method according to claim 1 wherein the colloid does not permeate the membrane.

8. A method according to claim 1 wherein the hydrophilic colloid is hydroxyethylcellulose.

* * * * *